United States Patent [19]

Nakai et al.

[11] Patent Number: 4,798,867

[45] Date of Patent: Jan. 17, 1989

[54] IMPACT RESISTANT THERMOPLASTIC RESIN COMPOSITION

[75] Inventors: Yoshio Nakai, Iwakuni; Masamitsu Tateyama, Yamaguchi, both of Japan

[73] Assignee: Mitsubishi Rayon Company Ltd., Tokyo, Japan

[21] Appl. No.: 139,303

[22] Filed: Dec. 29, 1987

Related U.S. Application Data

[62] Division of Ser. No. 726,977, Apr. 25, 1985, Pat. No. 4,740,557.

[30] Foreign Application Priority Data

Apr. 28, 1984 [JP] Japan .................................. 59-85112

[51] Int. Cl.$^4$ .......................... C08F 8/00; C08F 33/02
[52] U.S. Cl. .................................. 525/196; 525/221; 525/222
[58] Field of Search ....................... 525/196, 221, 222

[56] References Cited

U.S. PATENT DOCUMENTS 4,244,413  1/1981  Takahashi et al. ................. 525/196
4,487,890  12/1984  Keshida et al. ..................... 525/221

Primary Examiner—Jacob Ziegler
Attorney, Agent, or Firm—Oblon, Fisher, Spivak, McClelland & Maier

[57] ABSTRACT

Disclosed is an impact-resistant thermoplastic resin composition which comprises a graft copolymer [II]. The graft copolymer [II] is prepared by enlarging the particles in a latex of a rubbery copolymer [I] formed by emulsion polymerization of a monomer mixture of 51–91 wt. % of an alkyl acrylate and 49–1 wt. % of 1,3-butadiene to adjust the particle size to 0.12–0.4 μm by addition of (A) an acid group-containing copolymer obtained by performing emulsion polymerization of a mixture of 3–40 wt. % of acrylic acid, methacrylic acid, itaconic acid, crotonic acid, maleic acid, fumaric acid, cinnamic acid, sorbic acid and/or p-styrene-sulfonic acid, and 97–35 wt. % of an alkyl acrylate, and (B) a salt of an oxyacid having a central element of Groups III to VI of the periodic table, the element belonging to the second or third period, with an alkali or alkaline earth metal or Zn, Ni or Al; and then, polymerizing in the presence of the enlarged rubber copolymer a monomer or monomer mixture comprising 50–100 wt. % of methyl methacrylate and/or styrene. A polymer or copolymer of methyl methacrylate and/or styrene may be incorporated in the thermoplastic resin composition.

9 Claims, No Drawings

IMPACT RESISTANT THERMOPLASTIC RESIN COMPOSITION

This is a division of application Ser. No. 06/726,977, now U.S. Pat. No. 4,740,557 filed Apr. 25, 1985.

BACKGROUND OF THE INVENTION (1) Field of the Invention

The present invention relates to a novel thermoplastic resin composition having an excellent impact resistance.

(2) Description of the Related Art

Impact-resistance resins represented by ABS resins and high-impact polystyrene are ordinarily prepared by graft-polymerizing styrene, acrylonitrile, methyl methacrylate or other monomers to a rubber component. The physical properties of the final resin compositions are greatly influenced by the composition and structure of the graft copolymer, the content of the rubber component, and the polymerization method. Especially where a monomer is graft-polymerized on a rubber component according to the emulsion polymerization method, as is well-known, the particle size of the rubber component as the substrate has a great influence on the impact resistance and processability of the final resin composition. Namely, as the rubber particle size is increased, the impact resistance and processability of the obtained resin are improved.

Various methods for increasing the rubber particle size as much as possible have heretofore been proposed. For example, a resin composition having a good impact resistance has been proposed which is obtained by polymerizing a mixture comprising at least one monomer selected styrene, acrylonitrile, and methyl methacrylate, and monomers copolymerizable therewith, and having a group $CH_2=C<$ in the presence of a large-particle-size rubber latex obtained by enlarging a diene rubber with a copolymer latex formed from an unsaturated acid monomer and an alkyl acrylate (see Japanese Unexamined Patent Publication No. 58-63713). However, where a rubber component comprising butadiene units is used as the main structural units, the initial impact resistance of the obtained resin composition is excellent, but the resin composition has poor weatherability and low heat-resistant stability. If a styrene/butadiene copolymer is used as the rubber component, the styrene units reduce the rubbery characteristics of the copolymer, and therefore, the impact resistance of the obtained resin composition at low temperature is poor.

A resin composition comprising a graft copolymer obtained by enlarging a rubber only with an acid group-containing copolymer has excellent impact resistance, but the composition has a low enlarging efficiency and the molded article obtained as the final product has poor transparency and does not have an attractive appearance.

SUMMARY OF THE INVENTION

Under the above-mentioned background, it is the primary object of the present invention to provide a thermoplastic resin composition having an excellent impact resistance, especially impact resistance at low temperatures, a good transparency, an attractive appearance, a reduced heat-discoloring property, and a good weatherability.

In one aspect of the present invention, there is provided an impact-resistant thermoplastic resin composition comprising a graft copolymer [II], which is obtained by:

enlarging the particles in a latex of a rubbery copolymer [I] formed by emulsion polymerization and having a composition (a) comprising 51% to 99% by weight of units of an alkyl acrylate having 2 to 8 carbon atoms in the alkyl group, 49% to 1% by weight of units of 1,3-butadiene, and 0% to 10% by weight of units of a monofunctional or polyfunctional monomer copolymerizable with the alkyl acrylate and 1,3-butadiene to adjust the average particle size to 0.12 to 0.4 μm by the addition of:

(A) an acid group-containing copolymer in a polymer latex obtained by performing emulsion polymerization in one stage or multiple stages with the same or different monomer composition and having a composition (b) comprising 3% to 40% by weight of units of at least one unsaturated acid selected from the group consisting of acrylic acid, methacrylic acid, itaconic acid, crotonic acid, maleic acid, fumaric acid, cinnamic acid, sorbic acid, and p-styrene-sulfonic acid, 97% to 35% by weight of units of an alkyl acrylate having 1 to 12 carbon atoms in the alkyl group and 0% to 40% by weight of units of other copolymerizable monomers, and (B) at least one salt of an oxyacid having a central element selected from elements of Groups III, IV, V, and VI of the periodic table, said elements belonging to the second and third periods, with a metal selected from alkali metals, alkaline earth metals, zinc, nickel, and aluminum, the total amount of the acid group-containing copolymer (A) and the oxyacid salt (B) being in the range of 0.1 to 5 parts by weight based on 100 parts by weight of the polymer in the latex of the rubbery copolymer [I] and the proportion of the acid group-containing copolymer (A)/the oxyacid salt (B) being 1/(0.01 to 10) by weight; and polymerizing in one stage or multiple stages with the same or different composition in the presence of 100 parts by weight of the enlarged rubber copolymer [I'] 10 to 1000 parts by weight of (C) a monomer or monomer mixture having a composition (c) comprising 50% to 100% by weight of units of at least one monomer selected from methyl methacrylate and styrene and 50% to 0% by weight of a monofunctional or polyfunctional monomer copolymerizable with said monomer.

Furthermore, in another aspect of the present invention, there is provided an impact-resistant thermoplastic resin composition formed by incorporating the above-mentioned graft copolymer [II] with a thermoplastic resin [III] composed of a polymer of at least one monomer selected from methyl methacrylate and styrene or a copolymer comprising at least 70% by weight of at least one monomer selected from methyl methacrylate and styrene with up to 30% by weight of other monomers copolymerizable therewith in a proportion such that the content of the enlarged rubbery copolymer [I'] in the composition is 1 to 70% by weight.

DESCRIPTION OF THE PREFERRED EMBODIMENTS

The important feature of the present invention is that a rubbery copolymer having a relatively low glass transition point (Tg) and comprising an alkyl acrylate and 1,3-butadiene as main monomer components is used, which copolymer is comprised of a major amount of alkyl acrylate units exhibiting excellent weatherability and a minor amount of 1,3-butadiene in a range having no influence on the weatherability, and further that, in order to improve the impact resistance, the size of the particles of this rubbery copolymer is enlarged by the above-mentioned specific substance (A) and (B) to adjust the particle size within a specific range, and a graft copolymer is obtained by graft-polymerizing a hard resin component to the enlarged rubbery copolymer. Furthermore, this graft copolymer is incorporated with and dispersed in an other hard thermoplastic resin.

The rubbery copolymer [I] is obtained by emulsion polymerization of a monomer mixture comprising 51% to 99% by weight of an alkyl acrylate having 2 to 8 carbon atoms in the alkyl group, 49% to 1% by weight of 1,3-butadiene, and 0% to 10% by weight of other copolymerizable monomers. Butyl acrylate and 2-ethylhexyl acrylate are preferable as the alkyl acrylate. The other copolymerizable monomers include, for example, monofunctional monomers such as acrylonitrile and alkyl methacrylates, e.g., methyl methacrylate, and polyfunctional monomers such as divinyl benzene, ethylene glycol dimethacrylate, butylene glycol diacrylate, triallyl cyanurate, triallyl isocyanurate, trimethylol propane triacrylate, and pentaerythritol tetraacrylate.

The emulsion polymerization can be performed according to known procedures. A chain transfer agent such as mercaptan may be added in the polymerization mixture when the rubbery copolymer is prepared.

It is preferable that the particle size of the rubbery copolymer [I] be 0.03 to 0.20 μm, more preferably, 0.05 to 0.15 μm. If the particle size is outside this range, control of the rate of polymerization or the polymerization temperature becomes difficult, a desired particle size is difficult to obtain at the subsequent particle enlarging step, the polymerization system becomes unstable or the impact resistance or appearance of the final composition is often reduced.

The acid group-containing copolymer (A) comprising at least one unsaturated acid monomer selected from acrylic acid, methacrylic acid, itaconic acid, crotonic acid, fumaric acid, cinnamic acid, sorbic acid, and p-styrene-sulfonic acid, preferably, methacrylic acid or acrylic acid, and an alkyl acrylate having 1 to 12 carbon atoms in the alkyl group is used for enlarging the particles in the above-mentioned rubbery copolymer latex.

It is indispensable that this copolymer (A) comprise an unsaturated acid monomer as described above and an alkyl acrylate. At least one alkyl acrylate selected from alkylacrylates having 1 to 12 carbon atoms in the alkyl group is used, and butyl acrylate and 2-ethylhexyl acrylate are preferable as the alkyl acrylate.

Other copolymerizable monomers may be used in an amount of 0 to 40% by weight in combination with the alkyl acrylate. As the other copolymerizable monomers there can be mentioned, for example, methacrylic acid esters such as methyl methacrylate, styrene, styrene derivatives such as α-methylstyrene, and acrylonitrile.

The unsaturated acid monomer is used in an amount of 3 to 40% by weight. If the amount is smaller than 3% by weight, the particle enlarging capacity is insufficient. If the amount exceeds 40% by weight, the particle enlarging capacity is too strong and excessively large particles having a size exceeding 1 μm are formed.

The optimum amount of the unsaturated acid monomer depends on the hydrophilic degree of the alkyl acrylate used. When the hydrophilic degree of the alkyl acrylate is high, the particle enlarging effect is produced if the amount of the unsaturated acid monomer is small but, as the amount of the unsaturated acid monomer is increased, the latex is destroyed. On the other hand, when the hydrophilic degree of the alkyl acrylate is low, the particle enlarging effect is low if the amount of the unsaturated acid monomer is small and no substantial effect is attained unless the amount of the unsaturated acid monomer exceeds a certain level. For example, in the case of a highly hydrophilic alkyl acrylate such as methyl acrylate or ethyl acrylate, optimum results are obtained if the amount of the unsaturated acid monomer is 5 to 10% by weight. On the other hand, in the case of a hydrophobic alkyl acrylate having at least 4 carbon atoms, such as butyl acrylate or 2-ethylhexyl acrylate, optimum results are obtained if the amount of the unsaturated acid monomer is 13 to 20% by weight. When a highly hydrophilic alkyl acrylate is used, even if the amount of unsaturated acid monomer is 5 to 10% by weight, it often happens that the system becomes unstable and cullets (excessively enlarged coarse particles) are readily formed. On the other hand, if a hydrophobic alkyl acrylate as mentioned above is used, the system remains stable and uniform enlarged particles can be obtained.

The latex of the acid group-containing copolymer (A) used in the present invention may be prepared by polymerizing in one stage a monomer mixture comprising 3% to 40% by weight of at least one unsaturated acid selected from the above-mentioned unsaturated acids, 97% to 35% by weight at least one alkyl acrylate having 1 to 12 carbon atoms in the alkyl group, and 0% to 40% by weight of other copolymerizable monomers. Furthermore, a latex having a multi-layer structure including at least 2 layers may be prepared by performing the polymerization in at least two stages, that is, according to a process in which a portion occupying 5% to 90% by weight of the above-mentioned monomer mixture but not containing the unsaturated acid monomer is first polymerized and the remaining portion occupying 95% to 10% by weight of the monomer mixture and containing the unsaturated acid monomer is subsequently polymerized without the formation of new particles.

Also, at least one salt (B) of an oxyacid having a central element selected from elements of Groups III, IV, V, and VI of the periodic table, the elements belonging to the second and third periods, with a metal selected from alkali metals, alkaline earth metals, zinc, nickel, and aluminum is used as the enlarging agent for the latex of the rubbery copolymer (B). As specific examples of the oxyacid salt, there can be mentioned salts of sulfuric acid, nitric acid and phosphoric acid with potassium, sodium, magnesium, calcium, nickel, and aluminum, preferably, the oxyacid salts are potassium sulfate, sodium sulfate, magnesium sulfate, sodium hydrogenphosphate, and hydrogenmagnesium phosphate.

It is indispensable that the above-mentioned acid group-containing copolymer (A) and oxyacid salt (B) be used in combination. If one of them is used alone, various disadvantages are brought about. For example, the enlarging effect is insufficient, a good impact resistance can not be obtained, or the transparency or appearance of the final product is not satisfactory.

The total amount of the latex of the acid group-containing copolymer (A) and the oxyacid salt (B) is 0.1 to 5 parts by weight, preferably, 0.2 to 4 parts by weight, per 100 parts by weight of the base rubbery copolymer [I] as the polymer solids. The weight ratio of the oxyacid salt (B) to the acid group-containing copolymer (A) is in the range of from 0.01/1 to 10/1.

By the addition of appropriate amounts of the acid group-containing copolymer (A) and the oxyacid salt (B) to the substrate rubber [I], particle enlargement of the substrate rubber can be performed at a high efficiency and the stability of the large-particle-size rubber latex can be highly improved. Moreover, the impact resistance, transparency (haze value), and appearance (surface gloss) of the obtained molded article can be improved.

When the particle enlarging treatment of the present invention is carried out by using the acid group-containing copolymer (A), it is preferred that the pH value of the latex of the substrate rubber [I] be higher than 7. If the pH value is on the acidic side, the particle enlarging effect is low even if the latex of the acid group-containing copolymer (A) is added, and it sometimes happens that the intended composition of the present invention cannot be advantageously prepared.

The pH adjustment for increasing the pH value of the latex of the substrate rubber [I] above 7 may be performed during polymerization for the substrate rubber or may be carried out independently before the particle enlarging treatment.

It is preferable that the oxyacid salt be dissolved in water and be added in the form of an aqueous solution having a concentration of 10% to 30% by weight to the latex of the substrate rubber.

The intended impact-resistance resin of the present invention is obtained by polymerizing 10 to 1000 parts by weight of (C) a monomer comprising at least 50% by weight of styrene and/or methyl methacrylate in the presence of 100 parts by weight of the latex of the rubber enlarged in the above-mentioned manner. As the monomer to be grafted onto the rubber latex, there can be mentioned styrene alone, methyl methacrylate alone, a styrene/acrylonitrile monomer mixture, a styrene/acrylic acid ester monomer mixture, a methyl methacrylate/acrylonitrile monomer mixture, and a methyl metahcrylate/acrylic acid ester monomer mixture. Furthermore, a mixture comprising at least three monomers selected from the above-mentioned monomers may be used.

Moreover, polymerization may be carried out in at least two stages, for example, according to a process in which a known polyfunctional monomer (such as divinyl benzene, 1,4-butanediol diacrylate or 1,3-butylene dimethacrylate) is first added and grafted to a monomer composed mainly of methyl methacrylate and/or styrene or a mixture thereof, and then a monomer or monomer mixture free of a polyfunctional monomer is graft-polymerized.

As the alkyl acrylate to be used, there can be mentioned alkyl acrylates having 1 to 4 carbon atoms in the alkyl group, such as methyl acrylate, ethyl acrylate, propyl acrylate, and butyl acrylate.

Known emulsifiers and catalysts are ordinarily used for the emulsion graft polymerization, and the kinds and amounts are not particularly limited.

If the rubber content is lower than 1% by weight, the impact resistance is low and a practical composition can not be obtained. If the rubber content exceeds 70% by weight, the flowability and processability are degraded. It is preferable that the rubber content be 10 to 25% by weight.

A resin composition having a good impact resistance can be obtained by blending the above-mentioned graft copolymer [II] with a rubber-free thermoplastic resin [III].

The thermoplastic resin [III] is a polymer of at least one monomer selected from methyl methacrylate and styrene or a copolymer of at least 70% by weight of said monomer with up to 30% by weight of other copolymerizable vinyl monomers. As the copolymerizable other vinyl monomers, there can be mentioned an alkyl acrylate having 1 to 4 carbon atoms in the alkyl group and acrylonitrile.

As preferred examples of the thermoplastic resin [III], there can be mentioned poly(methyl methacrylate), a methyl methacrylate/alkyl acrylate copolymer, and a methyl methacrylate/styrene copolymer.

The thermoplastic resin [III] is incorporated with 1% to 70% by weight, preferably 5 to 40% by weight, of the enlarged rubbery polymer [I']. If the content of the enlarged rubbery copolymer is outside this range, the heat distortion temperature is lowered.

Known emulsions and catalysts may be used for the series of emulsion polymerizations for the production of the graft copolymer [II], and the amounts and kinds are not particularly limited. The latex of the graft copolymer [II] obtained by the emulsion polymerization process is coagulated and dried according to known procedures.

A melt-mixing method is an optimum method for incorporating the graft copolymer [II] with the thermoplastic resin [III]. Prior to melt-mixing, additives such as a stabilier, a lubricant, a plasticizer, a dye, a pigment, and a filler are added to the resin components according to need, and the mixture is blended by a V-blender or a Henschel mixer and then melt-kneaded at 150° C. to 300° C. by using a mixing roll or a screw type extruder.

The thus-obtained composition is molded by an extrusion molding machine or an injection molding machine, whereby a molded article having an excellent impact resistance at low temperatures and having a good weatherability and a good heat discoloration resistance is obtained.

The present invention will now be described in detail with reference to the following examples that by no means limit the scope of the invention. All of "parts" and "%" are by weight in the examples.

EXAMPLE 1

| | |
|---|---|
| Butyl acrylate | 6 kg |
| 1,3-Butadiene | 4 kg |
| Diisopropylbenzene hydroperoxide | 20 g |
| Potassium beef-tallow fatty acid salt | 100 g |
| Sodium N—lauroylsarcosinate | 50 g |
| Sodium pyrophosphate | 50 g |
| Ferrous sulfate | 0.5 g |
| Dextrose | 30 g |
| Deionized water | 20 kg |

In the above-mentioned substances, except 1,3-butadiene, contained oxygen was substituted with nitrogen so that the polymerization reaction was not inhibited by oxygen. Then, all the substances were charged in an autoclave having a capacity of 40 liters, and polymerization was carried out at 50° C. The polymerization was substantially completed in 9 hours. The conversion was 97% and a rubber latex having a particle size of 0.07 μm was obtained.

Synthesis for acid group-containing copolymer latex [A-1] for particle enlargement.

| First stage: | |
|---|---|
| n-Butyl acrylate | 250 g |
| Potassium oleate | 20 g |
| Sodium dioctylsulfosuccinate | 10 g |
| Cumene hydroperoxide | 1.0 g |
| Formaldehyde sodium sulfoxylate | 3 g |
| Deionized water | 2000 g |

A mixture having the above composition was charged in a round-bottom flask having a capacity of 5 liters and polymerization was carried out at 70° C. for 1.5 hours.

| Second stage: | |
|---|---|
| n-Butyl acrylate | 600 g |
| Methacrylic acid | 150 g |
| Cumene hydroperoxide | 3 g |

Subsequently, a mixture having the above composition was added dropwise to the reaction mixture over a period of 1 hour, and stirring was conducted for another 1 hour. A copolymer latex having a conversion of 98% was obtained.

Preparation of Enlarged Rubber Copolymer [I']

To a 60-liter autoclave charged with the latex of the rubbery copolymer [I] containing 10 kg of the polymer solids, 1.5 kg of a 10% aqueous solution of sodium sulfate was added with stirring at an inner temperature of 50° C., and the mixture was maintained in this state for 15 minutes. Then, 152 g of the latex [A-1] was added to the mixture and the resulting mixture was maintained in this state for 30 minutes. The average particle size of the thus-obtained enlarged rubbery polymer [I'] was 0.148 μm.

Preparation of Latex of Graft Copolymer [II]

To the particle enlarging reaction vessel charged with the enlarged latex containing 10 kg of the polymer solids of the enlarged rubbery copolymer [I'], 9 kg of deionized water, 20 g of formaldehyde sodium sulfoxylate, and 50 g of sodium N-lauroylsarcosinate were added, and the inner temperature was elevated to 75° C. Polymerization was carried out by continuously adding the following starting substances over a period of 90 minutes.

| | |
|---|---|
| Methyl methacrylate | 4320 g |
| Ethyl acrylate | 180 g |
| n-Octylmercaptan | 6.75 g |
| Cumene hydroperoxide | 16 g |

After completion of the addition, polymerization was further conducted for 60 minutes. The conversion of methyl methacrylate was approximately 100%.

To the obtained polymer latex were added 58 g of styrenated phenol, 44 g of dilauryl thiodipropionate, and 58 g of triphenyl phosphite. The latex was coagulated with 0.25% aqueous sulfuric acid at a latex/water ratio of ½ and the latex then maintained at 85° C. for 5 minutes.

The obtained polymer was washed and dehydrated, and the residue was dried at 65° C. for 36 hours to obtain a white powder.

By using a Henschel mixer having a capacity of 20 liters, 2.9 kg of the thus-obtained powdery resin [II-1] was blended with 7.1 kg of a methyl methacrylate/methyl acrylate (99/1 by weight) copolymer resin, 10 g of stearic monoglyceride, and 50 g of an ultraviolet absorber (20 g/30 g mixtures of Tinuvin P/Sanol LS770 supplied by Ciba-Geigy Co./Sankyo K.K.). The composition was pelletized, at a temperature of 230° C. to 250° C. and a rotation number of 250 rpm, by using a biaxial extruder having a screw diameter of 30 mm (Model PCM-30 supplied by Ikegai Tekko K.K.). The pelletized resin was molded into test pieces having a size of 110 mm×110 mm×2 mm (thickness) or 70 mm×12.5 mm×6.2 mm (thickness) at a cylinder temperature of 250° C. under an injection pressure of 50 kg/cm² by using a screw type injection molding machine (Ankerwerke V-17-65 supplied by Nippon Seikosho K.K.). The test results are shown in Table 1.

As is apparent from these test results, the composition of the present invention has an excellent impact resistance at low temperatures and had good heat-resistant stability, heat discoloration resistance, and weatherability.

TABLE 1

| | Oxidative thermal degradation of resin powder [II][*1] (min) | Izod impact strength[*2] (kg · cm/cm) | | Accelerated weathering test[*3] | Yellowness[*4] Index (Y.I) | Haze value[*5] (%) | Gloss[*6] (%) |
|---|---|---|---|---|---|---|---|
| | | 23° C. | −30° C. | | | | |
| Example 1 | 250 | 9.4 | 5.7 | 7.1 | 15 | 1.9 | 98 |

Note
[*1]the time required for starting of violent absorption of oxygen at 170° C.: measured according to the method described on page 94 of "Test Methods and Evaluations of Polymeric Materials" complied by the High Polymer Association (published by Baifukan)
[*2]measured according to the method of ASTM D-1003-52
[*3]Suga tester and sunshine weather-ometer Model WEL-SUN-DC were used; measured after 1000 hours exposure at 23° C.
[*4]measured according to ASTM D-1925
[*5]measured according to ASTM D-1003-52
[*6]measured according to ASTM D-673-44 at an incident angle of 60°

EXAMPLE 2 AND COMPARATIVE EXAMPLES 1 THROUGH 3

Impact-resistant thermoplastic resin compositions were prepared in the same manner as described in Example 1 except the components of the monomer mixture constituting the rubbery copolymer [I] were changed as shown in Table 2. The evaluation results are shown in Table 3.

TABLE 2

|  | Butyl acrylate (kg) | 1,3-Butadiene (kg) | Styrene (kg) | 1,3-Butylene dimethacrylate (g) | t-Dodecyl mercaptan | Rubber particle size (μm) [I] | [I]' |
| --- | --- | --- | --- | --- | --- | --- | --- |
| Example 2 | 5.5 | 4.5 | — | — | 20 | 0.07 | 0.14 |
| Comparative Example 1 | — | 10 | — | — | — | 0.08 | 0.16 |
| Comparative Example 2 | — | 4.5 | 5.5 | — | 20 | 0.07 | 0.14 |
| Comparative Example 3 | 10 | — | — | 50 | — | 0.07 | 0.15 |

TABLE 3

|  | Oxidative thermal degradation of resin powder [II] (min) | Izod impact strength (kg · cm/cm) 23° C. | −30° C. | Accelerated weathering test | Y.I. value | Haze value (%) | Gloss (%) |
| --- | --- | --- | --- | --- | --- | --- | --- |
| Example 2 | 240 | 9.8 | 5.6 | 7.0 | 14 | 1.7 | 97 |
| Comparative Example 1 | 35 | 9.6 | 5.8 | 3.9 | 24 | 18 | 89 |
| Comparative Example 2 | 190 | 4.6 | 2.3 | 3.5 | 18 | 25 | 89 |
| Comparative Example 3 | 540< | 5.1 | 2.1 | 4.1 | 13 | 20 | 90 |

From the results shown in Table 3, the following can be seen. As compared with the composition of the present invention (Example 2), a rubber having a higher butadiene unit content has poor heat-resistant stability and weatherability (Comparative Example 1), a rubber containing a larger amount of styrene units has poor impact resistance (Comparative Example 2), and a rubber free of butadiene units has poor impact resistance at low temperatures (Comparative Example 3).

EXAMPLES 3 THROUGH 5 AND COMPARATIVE EXAMPLES 4 THROUGH 9

Impact-resistant thermoplastic resin compositions were prepared in the same manner as described in Example 1 except that the kinds and amounts of the monomers of the monomer mixture constituting the acid group-containing copolymer (A) and the kinds and amounts of the latex of the acid group-containing copolymer (A) and the oxyacid salt (B), added to the rubber latex [I], were changed as shown in Table 4. The evaluation results are shown in Table 5.

TABLE 4

|  | Composition of monomer mixtures | | | | | | Particle enlarging treatment | | | | Rubber particle size (μm) | |
| --- | --- | --- | --- | --- | --- | --- | --- | --- | --- | --- | --- | --- |
|  | First stage (g) | | | Second stage (g) | | | Amount of acid group-containing copolymer latex (g) | Amount of oxyacid salt (g) | | | | |
|  | BA*1 | MAA*2 | MMA*3 | BA | MAA | AA*4 | | Aq. 10% magnesium sulfate | Aq. 10% sodium di-hydrogen-phosphate | Aq. 10% magnesium dihydrogen-phosphate | [I] | [I]' |
| Comparative Example 4 | 850 | 150 | — | — | — | — | 1000 | — | — | — | 0.07 | 0.36 |
| Example 3 | 250 | — | — | 600 | — | 150 | 152 | 300 | — | — | 0.07 | 0.32 |
| Comparative Example 5 | 250 | — | — | 500 | 250 | — | 600 | — | — | — | 0.07 | 0.32 |
| Comparative Example 6 | — | — | — | — | — | — | — | — | — | — | 0.07 | 0.07 |
| Comparative Example 7 | — | — | — | — | — | — | — | 300 | — | — | 0.07 | 0.10 |
| Comparative Example 8 | 250 | — | — | 750 | — | — | 152 | — | — | — | 0.07 | 0.08 |
| Comparative Example 9 | 750 | 250 | — | — | — | — | 500 | — | — | — | 0.07 | 0.31 |
| Example 4 | 850 | 150 | — | — | — | — | 200 | — | 300 | — | 0.07 | 0.22 |
| Example 5 | 850 | 150 | — | — | — | — | 200 | — | — | 100 | 0.07 | 0.24 |

Note
*1 butyl acrylate
*2 methacrylic acid
*3 methyl methacrylate
*4 acrylic acid

TABLE 5

|  | Oxidative thermal degradation of resin powder [II] (min) | Izod impact strength (kg · cm/cm) | | Y.I. value | Haze value (%) | Gloss (%) |
| --- | --- | --- | --- | --- | --- | --- |
|  |  | 23° C. | −30° C. Accelerated weathering test |  |  |  |
| Comparative Example 4 | 260 | 9.5 | 5.6  7.8 | 15 | 5.7 | 78 |
| Example 3 | 250 | 9.8 | 5.4  7.5 | 15 | 2.6 | 97 |
| Comparative Example 5 | 250 | 9.4 | 5.5  7.5 | 15 | 5.0 | 82 |
| Comparative Example 6 | 290 | 4.8 | 3.2  3.1 | 15 | 1.9 | 93 |
| Comparative Example 7 | 250 | 9.0 | 5.1  7.0 | 21 | 2.1 | 89 |
| Comparative Example 8 | 280 | 4.6 | 3.3  3.2 | 16 | 5.1 | 95 |
| Comparative Example 9 | 280 | 6.0 | 4.9  5.0 | 15 | 6.0 | 80 |
| Example 4 | 250 | 9.3 | 5.2  7.3 | 15 | 1.9 | 97 |
| Example 5 | 260 | 9.2 | 5.1  7.4 | 15 | 1.9 | 97 |

From the results shown in Table 5, it is seen that, in the compositions prepared according to processes other than the process of the present invention, enlarging of the rubber particles is not caused and the composition has poor physical properties.

EXAMPLES 8 THROUGH 12

An impact-resistant thermoplastic resin composition was prepared in the same manner as described in Example 1 except that the monomers and amounts of the monomer mixture (C) used for the graft polymerization, the kind and amount of the thermoplastic resin used for the blending, and the cylinder temperature at the injection molding were changed as shown in Table 6. The evaluation results shown in Table 7 were obtained.

In Example 8, a monomer mixture comprising 7.34 kg of 1,3-butadiene, 0.66 kg of butyl acrylate and 2 kg of styrene was used for the preparation of the rubbery polymer [I].

In Example 11, the graft polymerization was carried out in two stages. More specifically, a monomer mixture (C-1) was continuously added over a period of 30 minutes to effect polymerization, and after completion of the addition, the polymerization was conducted for 60 minutes. Then, a monomer mixture (C-2) was continuously added over a period of 90 minutes to effect polymerization, and after completion of the addition, the polymerization was conducted for 60 minutes. The same amount of cumene hydroperoxide as used in Example 1 was added to each of the monomer mixtures (C-1) and (C-2).

TABLE 6

|  | Composition of monomer mixture (C) (kg) | | | | | | | | Resin [III] | | Temperature of cylinder upon injection molding (°C.) |
| --- | --- | --- | --- | --- | --- | --- | --- | --- | --- | --- | --- |
|  | MMA | EA*1 | BDMA*2 | ST*3 | XM*6 | MMA | EA | XM*6 |  | Amount (kg) |  |
| Example 8 | 0.148 | 2.6 | 0.2 | — | 1.7 | 0.02 | — | — | — | MS resin*5 | 7.1 | 230 |
| Example 9 | 0.148 | 9.6 | 0.4 | — | — | 0.05 | — | — | — | MMA resin*7 | 27.55 Blended in two lots | 250 |
| Example 10 | 0.148 | 4.32 | 0.18 | — | — | 0.0225 | — | — | — | " | 2.81 | 260 |
| Example 11 | 0.148 | 0.495 | — | 0.005*4 | — | — | 3.84 | 0.16*4 | 0.02 | " | 7.1 | 260 |
| Example 12 | 0.148 | 28.5 | 1.5 | — | — | 0.02 | — | — | — | — | — | 260 |

Note
*1ethyl acrylate
*21,3-butylene dimethacrylate
*3styrene
*4MMA and BDMA were added in first stage and MMA and EA were added in second stage.
*5Methyl methacrylate/styrene (60/40 by weight) copolymer resin
*6n-Octyl mercaptan
*7Methyl methacrylate/methyl acrylate (99/1 by weight) copolymer resin

TABLE 7

|  | Oxidative thermal degradation of resin powder [II] | Izod impact strength (kg · cm/cm) | | | Y.I. value | Haze value (%) | Gloss (%) |
| --- | --- | --- | --- | --- | --- | --- | --- |
|  |  | 23° C. | −30° C. | Accelerated weathering test |  |  |  |
| Example 8 | 310 | 8.1 | 5.0 | 5.6 | 15 | 2.5 | 99 |
| Example 9 | 330 | 4.1 | 3.2 | 4.0 | 13 | 1.9 | 97 |
| Example 10 | 250 | 12.0 | 6.4 | 8.2 | 17 | 1.7 | 96 |
| Example 11 | 305 | 9.4 | 5.2 | 7.8 | 15 | 1.8 | 96 |

TABLE 7-continued

| | Oxidative thermal degradation of resin powder [II] | Izod impact strength (kg·cm/cm) | | | Y.I. value | Haze value (%) | Gloss (%) |
|---|---|---|---|---|---|---|---|
| | | 23° C. | −30° C. | Accelerated weathering test | | | |
| Example 12 | 300 | 8.9 | 5.7 | 6.4 | 16 | 1.9 | 96 |

From the results shown in Table 7, it is seen that even if the polymerization is carried out in multiple stages (Example 11) or the impact-resistant resin is blended into a methyl methacrylate/styrene copolymer (MS resin) instead of the PMMA resin, a valuable composition can be obtained.

We claim:

1. An impact resistant thermoplastic resin composition comprising a graft copolymer II obtained by:
   (i) emulsion-polymerizing a monomer mixture (a) comprising 51% to 99% by weight of an alkyl acrylate having 2 to 8 carbon atoms in the alkyl group and 49% to 1% by weight of 1,3-butadiene to obtain a rubbery copolymer I in the form of a latex;
   (ii) enlarging the particles of the rubbery copolymer I to an enlarged rubber copolymer I' by adjusting adjust the average particle size to 0.12 to 0.4 μm by the addition of:
      (A) an acid group-containing copolymer in the form of a polymer latex obtained by emulsion polymerizing a monomer mixture (b) comprising 3% to 40% by weight of at least one unsaturated acid monomer selected from the group consisting of acrylic acid, methacrylic, crotonic acid, cinnamic acid and sorbic acid, 97% to 35% by weight of an alkyl acrylate having 1 to 12 carbon atoms in the alkyl group, and 0% to 40% by weight of other copolymerizable monomer, according to an at least two stage polymerization process including the stages of first polymerizing a portion occupying 5% to 90% by weight of the monomer mixture (b) but not containing the unsaturated acid monomer and subsequently polymerizing the remaining portion occupying 95% to 10% by weight of the monomer mixture (b) and containing the unsaturated acid monomer, and
      (B) at least one salt of an oxyacid having a central element selected from the group consisting of the elements of Groups III, IV, V, and VI of the periodic table, said elements belonging to the second and third periods, with a metal selected from the group consisting of alkali metals, alkaline earth metals, zinc, nickel, and aluminum, the total amount of the acid group-containing copolymer (A) and the oxyacid salt (B) being in the range of 0.1 to 5 parts by weight based on 100 parts by weight of the solid polymer constituent in the latex of the rubbery copolymer I and the proportion of the acid group-containing copolymer (A)/the oxyacid salt (B) being 1/(0.01 to 10) by weight; and
   (iii) polymerizing in the presence of 100 parts by weight of the solid polymer constituent in the latex of the enlarged rubbery copolymer I' 10 to 1000 parts by weight of a monomer mixture (c) comprising 50% to 100% by weight of at least one monomer selected from the group consisting of methyl methacrylate and styrene and 50% to 0% by weight of other monofunctional copolymerizable monomer.

2. A composition as set forth in claim 1, wherein the acid group-containing copolymer (A) is a copolymer of methacrylic acid and butyl acrylate.

3. A composition as set forth in claim 1, wherein the acid group-containing copolymer (A) is a copolymer of acrylic acid and butyl acrylate.

4. A composition as set forth in claim 1, wherein the oxyacid salt is an alkali metal or alkaline earth metal salt of sulfuric acid or phosphoric acid.

5. A composition as set forth in claim 1 or 4, wherein the oxyacid salt is sodium sulfate.

6. A composition as set forth in claim 1, wherein the oxyacid salt is potassium sulfate.

7. A composition as set forth in claim 1, wherein the oxyacid salt is magnesium sulfate.

8. A composition as set forth in claim 1, wherein the oxyacid salt is sodium hydrogenphosphate.

9. A composition as set forth in claim 1, wherein the oxyacid salt is magnesium hydrogenphosphate.

* * * * *